Feb. 20, 1968    L. W. BURCH ETAL    3,370,142
CONDITION DETECTING CONTROL WITH MEANS TO ENABLE THE SYSTEM
TO RETURN TO ITS FIRST POSITION UPON A SLIGHT
CHANGE OF CONDITION

Filed Sept. 23, 1964      5 Sheets-Sheet 1

United States Patent Office 3,370,142
Patented Feb. 20, 1968

3,370,142
CONDITION DETECTING CONTROL WITH MEANS TO ENABLE THE SYSTEM TO RETURN TO ITS FIRST POSITION UPON A SLIGHT CHANGE OF CONDITION
Lyndon W. Burch, Three River St. Place, Boston, Mass. 02108, and Hadley K. Burch, Pittsfield, Vt. 05763
Filed Sept. 23, 1964, Ser. No. 398,508
14 Claims. (Cl. 200—122)

ABSTRACT OF THE DISCLOSURE

A means for increasing the responsiveness of a condition-detecting control system and especially applicable to snap action switches and other devices. The means applies a force acting in the return direction of the control member or the snap acting member but the force is only applied after the member has achieved its second position. In another aspect of the invention a spring applies a predetermined force proportioned to the return resistance of the control member. In another aspect of the invention the spring is associated with a bi-metal inhibitor which removes the effect of the spring when the control member is in the first position.

---

This invention relates to condition-detecting control systems and, in particular, to the type of system in which a detector is exposed to a changeable condition, such as temperature, pressure, or position. In such a system, when the condition being detected passes a selected limit value, the detector causes a control member to move from a first to a second position. Usually, by this movement, the control member controls a device such as a motor, heater, cooler or circuit, with one of the positions of the control member activating and the other deactivating the device. The detector allows the control member to remain in the second position so long as the condition does not repass the selected value, the detector causes the control member to return to its first position when the condition does repass the limit value, and then the detector allows the control member to remain in the first position until the selected value again is passed.

When active, usually, but not necessarily, the device being controlled, itself, is adapted to change the condition being detected toward the selected level.

In general, there has been a problem with such systems, especially with regard to low cost systems such as are used in household appliances. The problem has been that in the linkage of detector and control member there is an element which travels or otherwise deforms a substantial amount in moving the control member from the first to the second position.

To overcome this deformation and return the control member to the first position, an appreciable change or "differential" in the condition being detected has been required, hence such systems inherently have suffered from lack of sensitivity to the condition being detected.

It is a principal object of the invention to provide an effective and low cost solution to this problem.

The invention is useful, generally, to control flow in a conduit such as electrical power, air, or liquid, while the invention has particular importance in connection with snap acting flow control systems in which the movable control member is snapped between its two positions. Insensitivity is a particular problem with snap acting systems because of the resistance to movement offered by the snap element. But such systems are nevertheless in common use because, for instance, a snap acting electrical switch has the advantages over a creep action switch (which also can be improved by the present invention) of quickness in making and breaking contact and substantial contact pressure up to the point of breaking contact, with resultant ability to carry relatively large currents, and to do so without arcing. Similar and other advantages are obtained in snap action control of other flows.

As a specific example, over the past decade thermostats of the snap action type have been used extensively for various controls of electrical heating devices in the low cost field, for instance, for stoves, appliances, refrigeration, and air conditioning. But, the thermostats of snap action type capable of carrying large currents, particularly those of low cost, have had difficulty in approaching anything near "straight line temperature control," i.e. control within 1° to 3° F. of a desired temperature. With respect to many thermostats, temperature differentials have been little better than 10° F. total, and for these it has been necessary to use in most instances filled bulb and bellows as the temperature sensitive element, or in the case of bi-metal temperature sensitive elements, the bimetal elements have been required to be quite large in order to provide sufficient movement and power to operate the snap acting mechanism. For these reasons cost has been high, energy has been wasted, and some operations, such as cooking and air conditioning, have not been controlled to the desired accuracy.

The objects of the invention, therefore, include the achievement of condition-detecting control systems, especially systems responsive to temperature and systems having selectable levels of actuation, and in particular snap action control systems generally, and snap action electrical switches specifically, which are improved with regard to their sensitivity of operation and cost of construction; and a particular object of the invention is to provide a manually adjustable snap action thermostat having improved temperature differential.

The objects of the invention also include the provision of combination control systems and devices operated thereby, especially heating and cooling devices, in which the control system enables a simple accurate control of a condition being detected despite delay in the effect of the controlled device, e.g. delay in emission of heat of a heating device after activation and continued emission of heat after deactivation.

Among other objects of the invention are: To provide a low thermal differential (1 to 3° F.), with high current, 20 to 25 amps., in low cost snap action thermostatic switch and fluid controls; to make possible substantially "straight line" temperature control with positive snap action; to make it possible to utilize more widely all types of existing thermal actuators, such as liquid and gas filled bellows, immersion type actuators, etc., but especially inexpensive bimetal actuators, coupled with snap elements of conventional type; and to provide specific effective, practical, easy to manufacture and reliable condition-detecting control systems which operate according to the general principles of the invention.

The invention employs the combination of a condition-detecting control system having inherent deformation during actuation with an additional work-producing means which is adapted to become operable when the control member of the system reaches the second position, which applies energy in the return direction, but which becomes inoperative, and relaxes its effect when the control member returns to the first position.

According to the invention, the return means preferably utilizes external power, and, in particular, the fluid being controlled, e.g. the inherent electrical power in a circuit being controlled, to perform work in urging the control member from its second to its first position, the return means applying what may be considered an outside independent force to the control system to achieve the return function. Also it is preferable in many instances that each element: the detector, the control member and its carrier, and the return means, be separate, so that their functions do not interfere with one another, and preferably the return means has at least two elements, a means for applying a force, preferably of predetermined value, and a restraint means operable to control the times when the return force is applied. The return means can be adapted to apply a return force either directly upon the control member or at some other point in the detector-control member linkage.

Furthermore, the general principles of the invention can be employed in a number of modes, and by a wide variety of elements.

In one particularly useful mode the amount of force or energy applied by the return means is of a predetermined value, sized to be insufficient alone, to change the control member position. In this way the return means can always act simply to enable return of a snap acting carrier and the control member mounted thereon with a smaller change of the condition being detected than heretofore possible.

In another mode of the invention the amount of force or energy of the return means is of a predetermined value, sized, itself, to change the control member position when the condition being detected is within a predetermined narrow range of a selected mean value. With this mode, so long as the condition remains within the range, when the control member reaches its second position, the return means will, preferably with some delay, automatically cause return of the control member to the first position, whereupon the return means becomes inactive. This enables an automatic hunting movement of the control member between the two positions so long as the condition lies within the narrow range. It must be understood, however, that the condition being detected still is the chief control; that is to say, so long as the condition is above or below the predetermined narrow range, the control member resides steadily in one of the positions, depending upon the direction in which the existing condition lies relative to the selected mean value.

This latter, hunting mode of operation is particularly important for it enables correction for the tendency of many systems to over compensate, in changing the condition being controlled. For instance in a heating system the heater often becomes quite hot before the air temperature at the thermostat is raised back to the desired level. In such a case, when the thermostat turns off the heater, even if the thermostat had no temperature differential itself, the room temperature would not be held constant, but would continue to rise until the heater cooled. In the hunting mode, the heater is turned off earlier, depending upon the amount of delay designed into the return means, and due to the subsequent hunting movement of the control member, the swings in temperature produced by the heating system are damped, thus achieving a closer temperature control, a smaller "band spread."

To further illustrate the invention, there will now be discussed the problem and the solution offered by the present invention to snap action switches actuated by temperature responsive detectors, these being commonly known as "thermal actuators."

These actuators, of various types such as bimetal, liquid or vapor filled bellows or amplified motion of rod and tube, due to their limitations of size and cost, have very slight movements and forces in which to operate high-current rated snap switches. Their motions of necessity must be amplified many times in order to get sufficient motion to operate conventional snap switches but such amplification results in considerable loss in available force and introduces resilience into the system.

Any conventional over-center snap mechanism has the characteristic, that, to operate the switch, force acting over a distance, i.e. work, must be applied, or, more broadly, in the case of a bimetallic snap element, energy must be applied, to force the toggle or snap blade element to abruptly reverse or snap from its first to its second position. If a spring gram gage is used to operate a given switch the gage may read, for instance, 70 gr. immediately after snapping over center, if the switch is of the self-return type which will snap back to its first position when most of the operating force and movement of the actuator are removed.

If now we back off the gage, at some point, e.g. 30 gr., the switch will snap back to its first position. This shows that there has to be a release of 40 gr., and this also shows that lost motion is required for operation of the switch. (The characteristic of the mechanism which causes these results may be termed the "internal mechanical resistance" of the snap system.) Replacing this gram gage with a resilient thermal actuator, the temperature has to change sufficiently to move the actuator and release this 40 gr. force before snapping back will occur. This amount of temperature change required to supply the lost motion is called the "temperature differential" of the system.

To illustrate in another way let us consider a rigid actuator such as a micrometer to operate the snap action switch.

Referring now to the drawings

FIGS. 14–20 are side views of some preferred alternative constructions of the return means;

Figure 1:
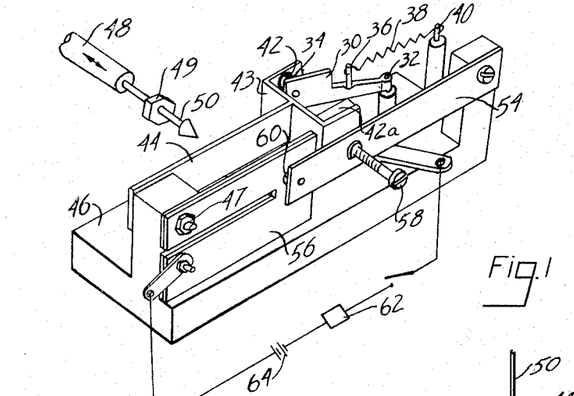
FIG. 1 is an isometric view of a preferred embodiment of the invention, the movable control member (for instance in this case the electrical contact) being stable in either position relative to the neutral.
Figure 2:
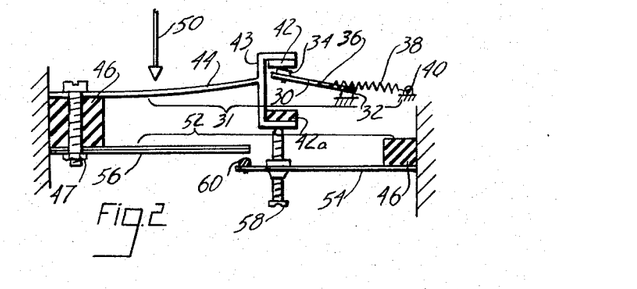
FIG. 2 is a partially diagrammatic cross sectional view of the embodiment of FIG. 1.

Referring now to FIGS. 1 and 2 a conventional control system 31 is shown in the form of a snap action toggle electrical switch in which a toggle carrier member 30 is pivotally mounted upon post 32 and carries an electrical contact 34. The carrier member has a pin 36 to which is attached a toggle spring 38 and the other end of the toggle spring is connected to a post 40 spaced from post 32 in the manner that when the spring extends over post 32 the toggle mechanism is in an unstable condition and can be snapped to either side with the spring 38 contracting, so that this system is of the non-return type. An electrical contact 42 and an insulated contact 42a are mounted on a U bracket 43 in spaced apart relation and on opposite sides of the movable contact 34. This U bracket is carried on a cantilevered spring arm 44 mounted at its other end upon insulator base 46. An adjustable detector 48, including manual adjustment means 49, of a conventional type has a push rod 50 which is arranged to engage the spring arm 44 causing the contact 42 to push the toggle mechanism over center to cause the toggle switch to snap to the other position against contact 42a.

So far described, this control system is representative of non-return snap action switches generally, including snap blade elements such as are shown in applicants' co-pending application entitled Snap-Acting Mechanisms, Ser. No. 311,194, filed Sept. 24, 1963, and the detector also can be considered as representative of the wide variety available detectors, including a wide variety of thermal actuators, e.g. the manually adjustable actuator shown in applicants' co-pending application entitled Thermo-Responsive Devices, Ser. No. 298,813, filed July 26, 1963.

According to the invention a return means 52 is provided to act upon this control system to increase its sensitivity. The preferred return means shown is adapted to apply an outside independent force to achieve the return function, the return means being separate from the control member (electrical contact 34), its carrier (the toggle arm 30), and the detector 48, in the manner that each can be designed independently so that from a design point of view their functions do not interfere.

In this preferred embodiment the return means comprises two main elements, a force applying member 54 and a restraint member 56. In this embodiment the force applying member 54 comprises a cantilevered spring arm mounted on base 46. An adjustment screw 58 is supported on this spring arm at a point spaced from the base 46 and having its end arranged to engage the U bracket 43 in order to move the contacts 42 and 42a generally along the path of the movable contact 34. (When operating according to the hunting mode, by adjustment of the screw 58 the force applied upon the control system can be varied, to vary the cycling rate.) The spring arm also carries an insulator member 60 whose function will be described later.

The restraint member 56 comprises a cantilevered arm formed of thermostatic bimetal, in this particular embodiment the arm having a U shaped configuration as shown in FIG. 1. The outer end of the restraint member 56 is adapted to engage insulator 60 and the bimetal member 56 is constructed and arranged, when energized, to apply a downward force against insulator 60 sufficient to overcome the force applying member 54 and prevent the engagement of adjustment screw 58 with the U bracket 43.

Referring to FIG. 1, a device 62 to be controlled is connected in series with a power source 64 and the control system 31. As shown the circuit extends from the device 62 through the post 32 thence through the toggle carrier member 30 to the electrical contact 34. When the contact 34 is engaged with contact 42, the circuit extends through spring arm 44 and bolt 47 to the U shaped restraint member 56, through this member, thence back to the power source.

Figure 3:
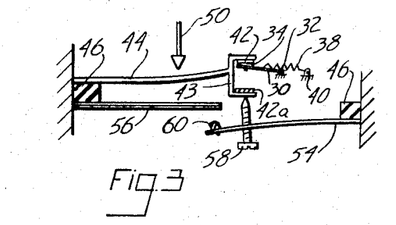
FIGS. 3, 4, 5, 6 and 7 are views similar to FIG. 2 showing the relation of the elements of the control system at various stages.

Referring to FIG. 3, before the power source 64 is energized, the toggle arm 30 is pushed to its upper position causing contact 34 to engage contact 42, then the adjustment screw 58 is adjusted to push up on bracket 43 a limited amount, care being taken that the contacts 34 and 42 remain engaged. This adjustment deflects the spring arms 44 and 58 as shown. The push rod 50 of the detector is then manually adjusted to engage the spring arm 44 at the appropriate setting for the condition being detected.

Figure 4:
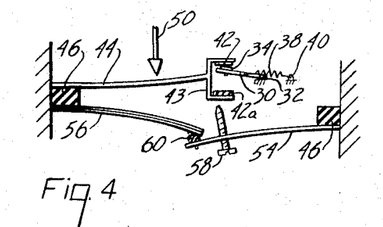

Referring to FIG. 4, the circuit is energized and the current flowing through the U shaped bimetallic member 56, whose high expansive side is the upper side, causes it to deflect downwardly and engage the force applying spring 54 through the insulator 60 sufficiently to deflect the spring 54 and disengage the adjustment screw 58 from the bracket 43. This achieves the normally closed position for the control system.

Figure 5:
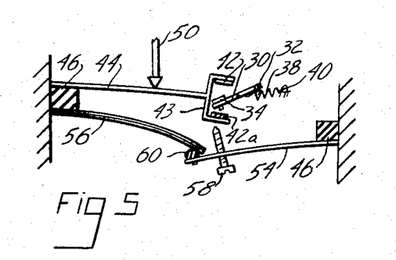

Referring to FIG. 5, when the condition being detected by the detector 48 changes, e.g. if the device 62 is a heater, and the detector is a thermo-actuator, when the temperature reaches a selected upper limit, the increased force applied by the detector push rod 50 upon the spring arm 44 causes the contact 42 to carry the toggle carrier member 30 past the null position and the toggle snaps over-center and engages the insulated contact at 42a. At the instant of this over-centering, as shown in FIG. 5, the restraint member 56 is still applying its restraining effect to the force applying member 54, the two being constructed and arranged so that even in the snapped-over position, as shown, the adjustment screw 58 does not engage the U bracket 43.

Figure 6:
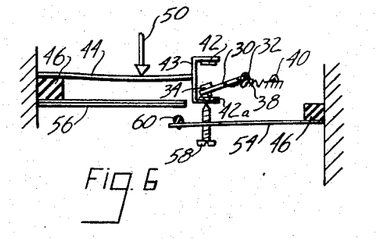

Referring to FIG. 6, the restraint member 56 cools and straightens, and first progressive and finally totally releasing the force applying member 54, which moves upwardly causing the adjustment screw 58 to apply its predetermined force upon the bracket 43. The action from hereon depends upon the particular mode of operation desired. If the force applying member 54 is cooperatively arranged with respect to the detector so that its effect is insufficient to cause the toggle carrier member 30 to snap upwardly, then the first mode of operation described above is achieved, the toggle carrier member resides in the position shown in FIG. 6, and the control system awaits a slight change in the condition being detected, assuming that no change has occurred since the time of initial snap-over, and the return means of the invention has the effect of decreasing the amount of change in the condition, e.g. temperature, required to return the contact 34 to its first position.

Figure 7:
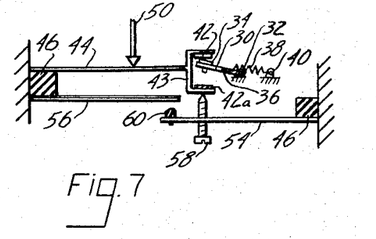

Assuming, however, that the second, hunting mode of operation described above is desired, the force applying member is constructed and arranged to apply a greater force, e.g. by being formed of metal having a greater stiffness, and, referring to FIG. 7, when the restraint member 56 releases the force applying member 54, the adjustment screw 58 moves the bracket 43 sufficiently that the contact 42a forces the toggle carrier member 30 beyond the null point and the toggle carrier member 30 snaps to the upper position, engaging contact 34 with contact 42. It will be observed, with this construction, that the snap back can occur with no change in the condition being sensed by the detector. But as soon as the contacts 34 and 43 engage, the circuit is again completed, and as the device 62 operates, e.g. heating the room, the restraint member 56 is heated and, after a delay depending upon the character of the bimetallic restraint member 56, that member again assumes the curved shape (shown in FIG. 5) and another hunting cycle of movement is commenced.

It is important to note that, for the hunting mode of operation, some resilience or give in the detector linkage must be present, but even in the case of rigid actuators, such as liquid filled bellows, it is easy to provide resilience, e.g. by interposing a spring arm in the linkage between the bellows and the point of application of the return force.

In the foregoing system, which by obvious changes can employ snap blades and other snap mechanisms, of the automatic return or non return type, it is advantageous that the force applying member be a spring member whose characteristics are not affected substantially by ambient temperature, for by such a spring, its force can be accurately determined, by proper selection of size, length, width, thickness and type of metal, which can be easily matched to the characteristics of the particular detector being employed.

Figure 8:
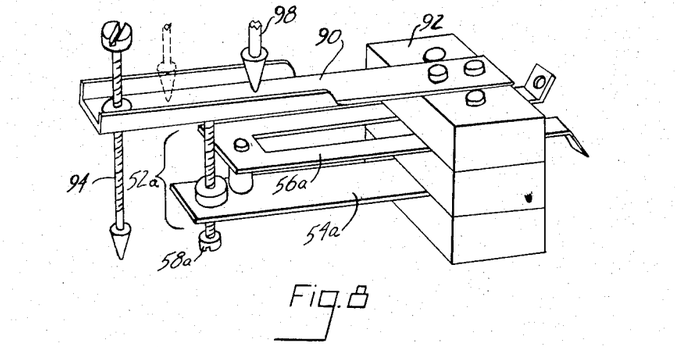
FIG. 8 is an isometric view of a preferred return means according to the invention adapted to receive a force from a detector and adapted to apply an actuating force to a control member or its carrier in a control system.
Figure 9:
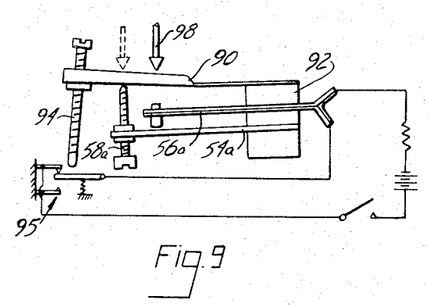
FIGS. 9 and 10, are views of the embodiment of FIG. 8 showing the relation of the elements of the return means in use with a normally closed switch.

Referring to FIG. 8, there is shown another preferred return means comprising a cantilevered spring arm 90 mounted on block 92 and carrying at its end a switch contacting rod 94 arranged to engage the actuating button of a control device, e.g. switch 95, FIG. 9. At an adjustable position along this cantilevered arm 90 a detector rod 98, e.g. of a thermal actuator, applies its actuating force and this force is transmitted through the arm 90 to rod 94. Beneath the spring arm 90 is located the return means 52a comprising a cantilevered U-shaped piece of bimetal as a restraint member 56a, similar to element 56 in the embodiment of FIGS. 1 and 2, and cantilevered spring member 54a with an adjustment screw 58a, similar to the spring member 54 and adjustment screw 58 of the embodiment of FIGS. 1 and 2.

Referring to FIG. 9 the return device of FIG. 8 is shown diagrammatically in a control system wherein switch 95 is to be actuated. As with the embodiment of FIG. 1 the bimetallic restraint member 56a is connected in series with the switch 95, the load and the source of power. When the circuit is not completed, as is the case in FIG. 9, the spring member 54a through its adjustment screw 58a releases the switch actuating rod 94a from the switch 95, hence the switch is maintained in its first position, normally closed.

Figure 10:
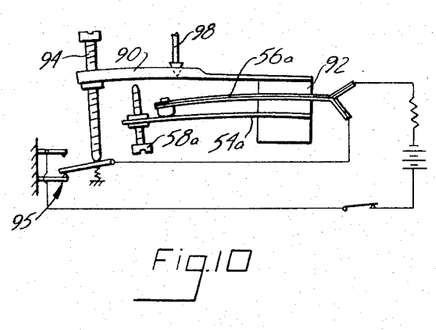

Referring to FIG. 10, with the circuit completed, restraint member 56a is heated by the current flowing therethrough, and, with the high thermal expansive side directed upwardly, the restraint member 56a warps downwardly. It overcomes the force of spring member 54a, disengages adjustment screw 58a from the spring arm 90, and causes switch actuating rod 94a to actuate switch 95, under the influence of detector rod 98, and move the control member of the switch to its second position. This breaks the circuit, and the restraint member 56a cools and warps upwardly until the position shown in FIG. 9 is reached where the restraint member 56a is completely released from the spring member 54a. The spring member 54a applies its force to the spring arm 90 and again releases the switch actuating rod 94 from the switch 95, hence, with the switch being an automatic return type of switch, the control member moves to its first position and another hunting cycle will be repeated, and this continuing so long as the detector rod 98 applies sufficient force to cause the rod 94a to operate the switch, and so long as the force of the actuator rod 98 is insufficient to overcome the force of the return spring member 54a. In the event that the detector rod 98 is withdrawn upwardly, with a change in the condition, the rod 94 will be released from the switch 95, and the switch will remain steadily in its upper position. On the contrary, if the condition being detected causes the detector rod 98 to move downwardly and apply sufficient force to overcome the spring member 54a, then the switch actuating rod 94 would continue steadily in the position shown in FIG. 10, maintaining the switch control member in its second position, while the adjustment screw 58 would stll engage the spring arm 90.

Referring to FIG. 9, with the detector rod 98 adjusted to a position outwardly along the spring arm 90, a point is reached, as indicated by the dotted line position, then the actuator rod would have to move upwardly slightly to allow the switch to snap back to its first, upper position, so that the return means now would not cause hunting, but would serve as an assist in returning.

Figure 11:
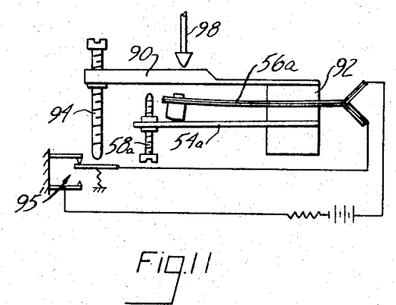
FIGS. 11 and 12 are views similar to FIGS. 9 and 10 showing the return means in use with a normally open switch.
Figure 12:
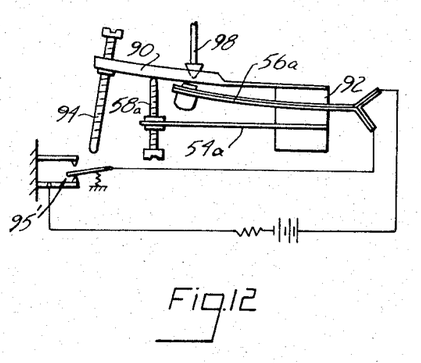

Referring to FIGS. 11 and 12, the return means of FIG. 8 is shown in conjunction with a normally open switch, in the upper, or first position. When the actuator rod 98 causes the switch to close, then the restraint member 56a, with high thermal expansive side down, warps upwardly, as shown in FIG. 12, releases the return force member 54a which overcomes the effect of actuator rod 98, and cause the switch to reopen, and another hunting cycle can then commence.

Figure 13:
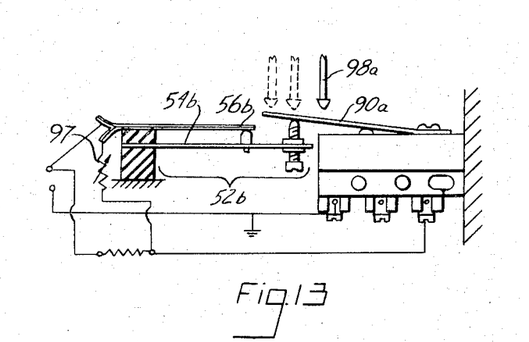
FIG. 13 is a side view of another preferred return means in combination with a normally closed switch.

Referring to FIG. 13 a restraint means 52b is shown, differing from the apparatus of FIG. 8 in that, instead of operating on its own spring arm 90, it operates on the spring arm 90a of a switch member, and the detector rod 98a operates in the opposite direction upon the same arm 90a, in any of the various positions indicated.

Furthermore, the bimetallic restraint member 56b is connected in parallel with the load, and has, in its circuit, a variable resistance device 97 which enables adjustment of the amount of current passing through the bimetallic member 56b, thus affording a means of adjusting the amount of force applied by the bimetallic member and also the amount of delay that can be obtained during the hunting mode of operation between movement of the control member to the second position and return to the first.

Figure 14:
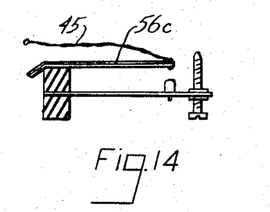

Referring to FIG. 14 instead of a U-shaped piece of bimetallic material the restraint member 44c is a straight piece and capable of being connected in circuit by a flexible pigtail wire 45.

Figure 15:
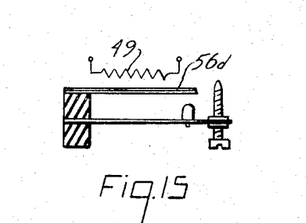

Referring to the embodiment of FIG. 15, the restraint member 56d is not in the circuit at all, but a heater 49 is placed either in series or in parallel with the load as described above and controls the deflection of the restraint member. As in the prior embodiments, the heating of the bimetallic member 56b can be controlled by a separate circuit from that operating the device, simply by employing double contacts which move together controlling two circuits at once.

Figure 16:
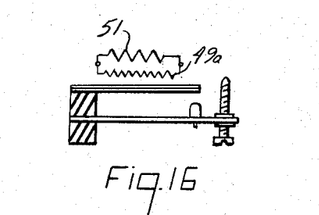

The embodiment of FIG. 16 is similar to that of FIG. 15 except that the heater 49a is shown with a shunt 51 enabling the heater to be connected in series with the load.

Figure 17:
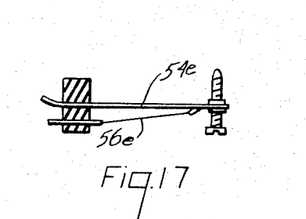

The embodiment of FIG. 17 employs a thermally expanding wire 56e (known as a "hot wire") as the restraint member for the spring member 54e in place of the bimetallic element, this preferably also being shunted if connected in series.

Figure 18:
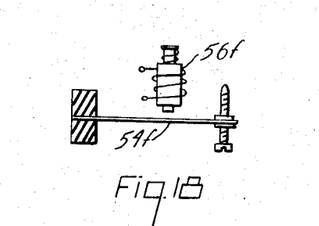

The embodiment of FIG. 18 employs a solenoid 56f as the restraint member for the spring member 54f. When used alone the solenoid is capable of use according to the first mode of operation described above, and with a delay in its power circuit permitting the control member to reside in both its first and second positions for a period of time after the control member has moved, the embodiment of FIG. 18 is capable of use in the hunting mode.

The embodiment of FIG. 19 employs an electro magnet 56g with a pole piece 53 secured to the spring member 54g and operates similarly to the embodiment of FIG. 18.

Figure 20:
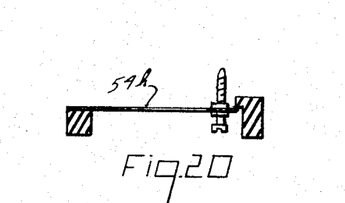

The embodiment of FIG. 20 comprises a spring member 54h of U shape, formed of bimetallic material and connected electrically similar to the connections for the restraint member 56 of FIG. 1. In this embodiment the single member performs both the force applying function, when the power is off, and the restraint function when the power is on, as the heat of the current passing through the bimetal curves it away from applying force to the control system.

Figure 21:
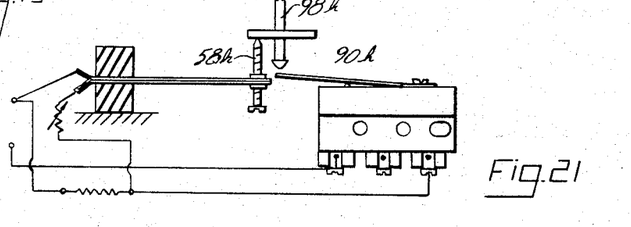
FIG. 21 is a side view of a return means arranged to apply its return force directly upon a detector.

The embodiment of FIG. 21 is similar to the embodiment of FIG. 20, but is shown to apply its force through adjustment screw 58h directly to the detector rod 98h, and the detector rod 98h alone contacts the arm 90h of the switch.

Figures 22, 23, 25, 26, 27, 28:
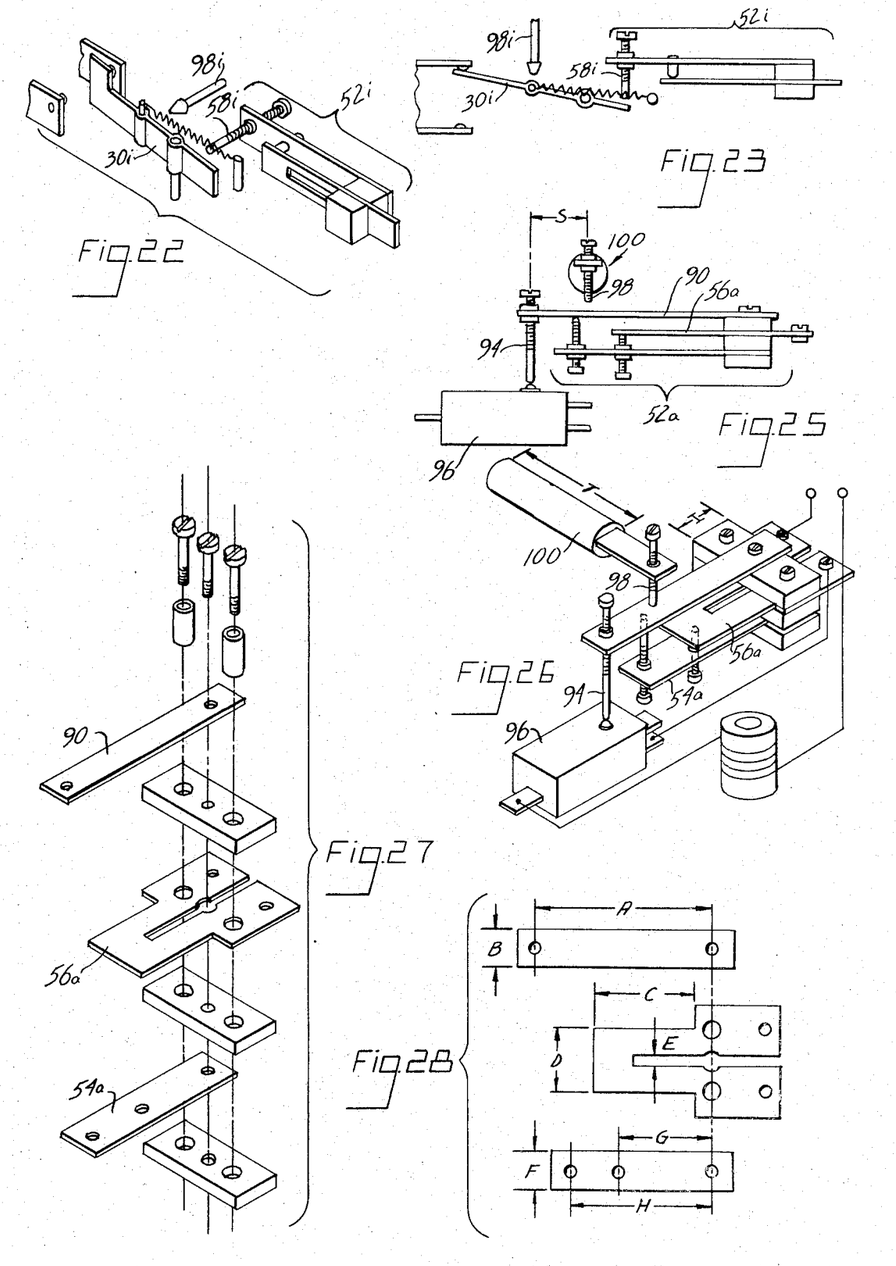
FIG. 22 is an isometric view of a preferred snap action control system having two points of actuation with a detector arranged to act on one of the points and a return means arranged to act upon the other.
FIG. 23 is a side view of the embodiment of FIG. 22.
FIG. 25 is a side view of the test mechanism employed in producing the graph of FIG. 24.
FIGS. 26 and 27 are respectively isometric and exploded views of the mechanism shown in FIG. 25.
FIG. 28 is a plan view of the individual elements of FIG. 27, indicating the dimensions.

The embodiment of FIGS. 22 and 23 employs a toggle carrier member 30i having two regions for actuation with the detector rod 98i acting at one and the adjustment screw 58i of the return means 52i acting upon the other of the regions.

Referring to the graph of FIG. 25 and the apparatus of FIGS. 25–28, this test was conducted employing an "N" actuator such as shown in applicants' application Ser. No. 298,813, referred to above, as the detector element, and a commercial micro switch manufactured by Minneapolis Honeywell Corporation, Model No. 1 PL 4.

In the test setup shown, the return means employed is substantially identical to the return means shown in FIG. 8 and the same reference characters are employed.

The switch contacting rod 94 at its end is arranged to engage the actuating button of the micro switch 96. At a selected point along the cantilevered arm 90 the actuator rod 98 of the "N" actuator 100 applies its actuating force and this force is transmitted through the arm 90 to rod 94. Beneath the spring arm 90 is located the return means 52a comprising a U shaped piece of bimetal 56a as a restraint means, connected in series with the switch 96.

In this embodiment the spring member 54a was made of a beryllium copper-strip of a thickness of .025 inch and width dimensions, referring to FIG. 28, of F, ¼ inch, G, $^{15}\!/_{16}$ inch, and H, $1^{11}\!/_{64}$ inch. The spring arm 90 was also formed of beryllium copper strip of a thickness of .025 inch and had dimensions A, $1^{35}\!/_{64}$ inch and B, ¼ inch.

The U shaped bimetal restraint member 56a was formed of Metals and Controls Corporation P675R bimetal of a thickness of .025 inch and having dimensions C, ⅞ inch, D, $^{11}\!/_{32}$ inch, and E, $^{5}\!/_{32}$ inch. The width of the mounting block 92 is designated I in FIG. 27 and was ⅜ inch during the test.

Figure 24:
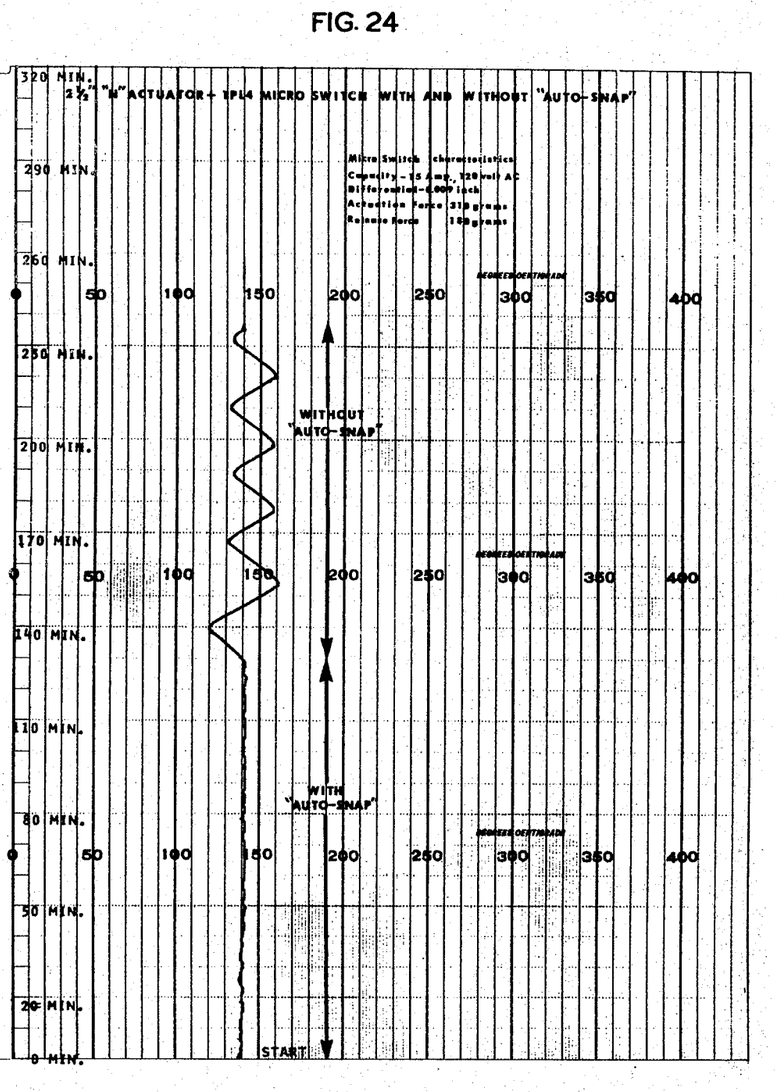
FIG. 24 is a graph showing test results of a control system operating without the invention and operating with the invention according to the hunting mode of operation.

In the particular tests producing the results shown in FIG. 24 the spacing of the actuator 98 from the switch contacting rod 94, dimension S in FIG. 26, was $^{7}\!/_{16}$ inch.

The tests were conducted by inserting and rigidly mounting the actuator 100 in a hole in an aluminum block 101 heated by heater 102 which was connected to a source of steady power of 110 volts. The current passed through all electrical elements, namely the switch 96, the heater 101, and the restraint member 56a during the two tests, and a substantially steady current was maintained of 15 amps.

In the first test the adjustment screw 58a carried by the cantilevered spring arm 54a was adjusted to engage the cantilevered arm 90 to apply an upward force sufficient to allow the micro switch 96 to snap to its upper or first position when no power was passing through the circuit. The circuit was energized with the actuator 100 sensing the temperature of the block 101. As shown in the graph FIG. 24 very soon after energization of the circuit, through the hunting action according to the invention, the temperature settled down with very small changes occurring.

In the second test the screw 58 was backed off so far that at no time during operation did it engage the spring arm 90. The switch contacting rod 94 was adjusted upwardly relative to the spring member 90 to compensate for the removal of the adjustment screw 58a, the lower end of the rod 94 being at the same level in both tests.

As can be seen in the graph in FIG. 24, with the restraint means thus disabled, the control system suffered bad swings in temperature which continued throughout the duration of the test.

It will be appreciated that numerous specific details of the invention can be changed within the spirit of the invention.

What is claimed is:

1. A device for increasing the responsiveness of a condition-detecting control system that comprises a detector operatively connected to a control member, the control member movable between a first position and a second position to perform its control function, the detector responsive when the changeable condition reaches a predetermined limit to produce a force in said system sufficient to cause movement of the control member from its first to its second position, said device comprising a spring member separate from said control member and a bimetal restraint member, said spring member adapted to engage and apply force to said control system in the direction opposite to said force of the detector for enabling movement of said control member from said second to said first position, means to energize said bimetal member only when said control member is in said first position, said bimetal member positioned when energized to overpower and disengage said spring member from said control system.

2. The device of claim 1 wherein said spring member and said bimetal restraint member are each of cantilever, leaf-form, the fixed ends of each mounted upon a common support in a spaced-apart relationship.

3. The device of claim 2 wherein said bimetal restraint member is of U shape, the ends of the U shape being mounted to said support and connected respectively to a pair of terminals.

4. In a snap acting condition-detecting control system having a detector operatively connected to a snap control member, said detector responsive when the changeable condition reaches a predetermined limit to produce a force in said system sufficient to cause snap movement of said control member from a first position to a second position, said snap acting control system having a predetermined internal mechanical resistance characteristic which, after actuation by said detector from said first to said second position, requires the action of a force through a distance before said snap member can snap back to its first position, resulting potentially in a substantial differential in said changeable condition between actuation and return of said snap member, the improvement comprising a work producing means including a return member constructed to apply a return force through a distance upon said snap system, said return force of a predetermined value approximating the said internal mechanical resistance of said system and being in the direction opposite to the force of the detector, and means responsive to said position of said snap member preventing the application of force by said return member when said snap member is in said first position and causing said return member to apply said force when said snap member is in its second position thereby to enable said system to return to said first position upon only a slight change of said condition and response by said detector to said change of condition.

5. The combination of claim 4 wherein said return member comprises a spring member having predetermined spring characteristics sized to substantially neutralize said internal mechanical resistance characteristic.

6. The combination of claim 4 wherein said means responsive to said position of said snap control member include an electrical circuit responsive to the position of said snap control member.

7. The combination of claim 4 wherein said means responsive to said position of said snap control member comprises a bimetallic member, and said return member comprises an auxiliary spring means, said bimetallic member deformable, by temperature change, when said snap acting control member is in said first position, to prevent said spring member from acting upon said system and deformable in the reverse direction by reverse temperature change to enable said auxiliary spring means to act upon said system.

8. The combination of claim 4 wherein said means responsive to said position of said snap control member comprises a bimetallic member, and energizing means arranged to selectively heat and cool said bimetallic member in accordance with the position of said snap acting control member, said bimetallic member sized and arranged to gradually deform in response to said energizing means causing its enabling effect to be gradual.

9. The combination of claim 4 in which said snap acting member is substantially neutrally mounted requiring the application of substantially the same external work to be applied for forcing it from either of said positions to the other position.

10. In combination with the device of claim 1, a condition detecting control system comprising a detector responsive to a changeable condition, a snap acting control member movable between two positions, a spring arm upon which said detector exerts a varying force dependent on the value of said condition, said spring arm mounted to urge said snap acting control member from a first to a second position when said condition reaches a predetermined limit, the spring member of said device comprising a cantilevered return spring in the form of a leaf spring, having a projection attached near its free end, contacting said spring arm, and urging said spring arm back toward said detector, and said bimetal restraining member mounted between said leaf spring and said spring arm, and deformable, on heating, against said leaf spring to prevent said leaf spring from contacting said spring arm.

11. The device of claim 1 wherein said system includes a mounting structure comprising a series of stacked insulating blocks, a spring arm mounted in cantilever fashion on top of a first block, said spring arm arranged to be engaged by a detector and shaped to engage and actuate the control member, said bimetal member being of sheet form and mounted between said first block and a second block, as a cantilever similar to said spring arm, said spring member being in the form of a leaf spring, mounted beneath said second block, and said bimetal member adapted to contact said leaf spring upon deformation.

12. The combination described in claim 9 wherein said projection on said return spring member is adjustable toward said spring arm.

13. The combinaton described in claim 12 wherein said projection is so adjusted as to be less than the force required to cause movement of said snap acting member from said second to said first position, upon release of said return spring member.

14. The combination of claim 4 wherein said means responsive to the position of said control member comprises a bimetal member and said control member comprises an electrical snap action switch member, said bimetal member and said snap action switch member being electrically connected in series circuit, said series circuit arranged to be completed only when said snap member is in said first position.

References Cited
UNITED STATES PATENTS

| | | | |
|---|---|---|---|
| 2,564,321 | 8/1951 | Brosseau | 200—122 X |
| 2,583,547 | 1/1952 | Cox | 200—122 |
| 2,629,034 | 2/1953 | Harrold | 200—67 |
| 2,781,485 | 2/1957 | Slocum | 200—122 X |
| 2,838,645 | 6/1958 | Welch | 200—122 X |

BERNARD A. GILHEANY, *Primary Examiner.*

H. A. LEWITTER, *Assistant Examiner.*